United States Patent
Ozawa (10) Patent No.: US 9,479,551 B2
(45) Date of Patent: Oct. 25, 2016

(54) CONTENT DISTRIBUTION SYSTEM, CACHE SERVER, AND CONTENT DISTRIBUTION METHOD

(75) Inventor: Kazunori Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 279 days.

(21) Appl. No.: 14/344,501

(22) PCT Filed: Sep. 14, 2012

(86) PCT No.: PCT/JP2012/073739
§ 371 (c)(1),
(2), (4) Date: Mar. 12, 2014

(87) PCT Pub. No.: WO2013/042639
PCT Pub. Date: Mar. 28, 2013

(65) Prior Publication Data
US 2014/0344414 A1    Nov. 20, 2014

(30) Foreign Application Priority Data

Sep. 21, 2011   (JP) .................................. 2011-205464

(51) Int. Cl.
*G06F 15/16* (2006.01)
*H04L 29/06* (2006.01)
(Continued)

(52) U.S. Cl.
CPC ........... *H04L 65/4076* (2013.01); *H04L 29/06* (2013.01); *H04L 29/08072* (2013.01); *H04N 21/2225* (2013.01); *H04N 21/23106* (2013.01);
(Continued)

(58) Field of Classification Search
CPC ............ H04L 29/08072; H04L 29/06; H04N 21/23406
USPC ................................................. 709/217–219
See application file for complete search history.

(56) References Cited

U.S. PATENT DOCUMENTS

2008/0192710 A1   8/2008   Balachandran et al.
2009/0147685 A1*  6/2009   Malhotra ................ H04L 47/10
                                                         370/236
(Continued)

FOREIGN PATENT DOCUMENTS

| CN | 1588909 A | 3/2005 |
|---|---|---|
| CN | 1983907 A | 6/2007 |

(Continued)

OTHER PUBLICATIONS

Extended European Search Report of EP Application No. 12834192.2 dated on Apr. 17, 2015.
(Continued)

Primary Examiner — Chris Parry
Assistant Examiner — Weiwei Stiltner (57) ABSTRACT

A cache server comprises a storage unit that stores managed content held by a storage apparatus in a mobile network, determines, from among a plurality of cache servers provided in the mobile network, a cache server that stores content(s) requested by a mobile terminal, using information included in a content request message from the mobile terminal, estimates a bandwidth of the mobile network based on a signal from the mobile terminal, reads a file with a bit rate not exceeding the bandwidth among a plurality of files having the requested content(s) with different bit rates, from the determined cache server, and transmits the read file to the mobile terminal while controlling timing of transmission in accordance with a buffer capacity of the mobile terminal.

14 Claims, 6 Drawing Sheets

(51) Int. Cl.
| | |
|---|---|
| *H04N 21/234* | (2011.01) |
| *H04L 29/08* | (2006.01) |
| *H04W 4/06* | (2009.01) |
| *H04N 21/2225* | (2011.01) |
| *H04N 21/231* | (2011.01) |
| *H04N 21/24* | (2011.01) |
| *H04N 21/61* | (2011.01) |
| *H04N 21/647* | (2011.01) |

(52) U.S. Cl.
CPC .... *H04N 21/23406* (2013.01); *H04N 21/2401* (2013.01); *H04N 21/6131* (2013.01); *H04N 21/64738* (2013.01); *H04N 21/64769* (2013.01); *H04W 4/06* (2013.01)

(56) References Cited

U.S. PATENT DOCUMENTS

| | | | | |
|---|---|---|---|---|
| 2010/0128800 | A1* | 5/2010 | He | H04N 21/235 375/240.25 |
| 2010/0157795 | A1* | 6/2010 | Konishi | H04L 12/1836 370/230 |
| 2010/0268836 | A1 | 10/2010 | Jabri et al. | |
| 2010/0312828 | A1* | 12/2010 | Besserglick | H04L 65/602 709/203 |
| 2010/0333148 | A1 | 12/2010 | Musha et al. | |
| 2012/0069829 | A1* | 3/2012 | Cote | H04L 65/607 370/338 |
| 2012/0284371 | A1* | 11/2012 | Begen | H04L 65/1069 709/219 |
| 2013/0072167 | A1* | 3/2013 | Aguirre | H04W 48/10 455/414.1 |

FOREIGN PATENT DOCUMENTS

| | | |
|---|---|---|
| CN | 01945262 A | 1/2011 |
| JP | 10-336626 A | 12/1998 |
| JP | 2004-172830 A | 3/2004 |
| JP | 2010-518783 A | 5/2010 |
| WO | 2011024949 A1 | 3/2011 |
| WO | 2011/049179 A1 | 4/2011 |
| WO | 2011057292 A1 | 5/2011 |

OTHER PUBLICATIONS

Kenichi Fukasawa et al., "A study application method of caching system for mobile core network", IEICE Technical Report, NS2010-227, The Institute of Electronics, Information and Communication Engineers, Mar. 2011, pp. 367-370 with English Abstract. Cited in ISR.

Kevin J. Ma, et al., "Mobile Video Delivery with HTTP", IEEE Communication Magazine, vol. 49, Issue4, Apr. 2011, pp. 166-175. Cited in ISR.

Kozo Satoda et al., "Evaluation of Server- and Client-driven HTTP Adaptive Streaming", IEICE, 2011 nen IEICE Communications Society Conference Koen Ronbunshu 2, Sep. 13-16, 2011, B-6-41, pp. 41. See cited doc on p. 2 of translated ISR for explanation of relevance.

International Search Report for PCT Application No. PCT/JP2012/073739, mailed on Dec. 11, 2012.

Chinese Office Action for CN Application No. 201280046299.3 issued on Jul. 27, 2016 with English Translation.

* cited by examiner

CONTENT DISTRIBUTION SYSTEM, CACHE SERVER, AND CONTENT DISTRIBUTION METHOD

REFERENCE TO RELATED APPLICATION

The present application is a National Stage Entry of PCT/JP2012/073739 filed Sep. 14, 2012, which is based on and claims the benefit of the priority of Japanese Patent Application No. 2011-205464 filed on Sep. 21, 2011, the disclosures of all of which are incorporated herein in their entirety by reference.

FIELD

The present invention relates to a content distribution system, a cache server and a content distribution method, and in particular, to a content distribution system, a cache server and a content distribution method, by which video content is distributed to various kinds of terminal (for example, mobile telephone, smart phone, PC (Personal Computer), game apparatus and the like), after being cached in a mobile network.

BACKGROUND

It is anticipated that mobile networks will have higher speeds and larger capacities with LTE (Long Term Evolution) and EPC (Evolved Packet Core) technologies and the like. Accompanying this progress, it is expected that henceforth content distribution in which content is distributed to various types of terminal including mobile terminals, via a mobile network, will become popular.

Patent Literature (PTL) 1 describes a system in which servers storing identical content, created with a plurality of bit rates, switch bit rates in accordance with an instruction from a receiving terminal, to provide distribution.

Patent Literature 2 describes a video data transmission method in which, in a network environment where the bandwidth of a transmission channel between server and client is not guaranteed, in order to deliver the video without interruption, the client makes data transmission requests to the server as long as there is space in its own buffer.

PTL 1:
Japanese Patent Kokai Publication No. JP2004-172830A
PTL 2:
Japanese Patent Kokai Publication No. JP-H10-336626A

SUMMARY

The entire disclosed contents of the Patent Literatures described above are incorporated herein by reference. The following analysis is given by the present invention.

Henceforth, through 2013, it is expected that traffic volume of data systems in mobile networks will increase by 8 to 10 or more times the current volume, and the greater part of the volume increase will be occupied by video contents. Furthermore, with the enhanced performance of terminals accompanying the rapid popularization of smart phones, there will be further volume increases with regard to size of video contents. Therefore, in the near future it is expected that contents of large volume will be distributed with high vision resolution by mobile networks.

In the present situation, in a case of performing content distribution by a mobile network, much of the content distribution is done on the Internet. However, it is expected that henceforth high quality content distribution, that is, distribution of managed content that is managed by an operator, or distribution of managed content that is managed by an operator under contract to a CP (Content Provider) will become popular. This type of managed content is basically fee-based. Therefore, a mechanism for ensuring a high QoE (Quality of Experience) for viewers is necessary.

In light of this situation, in order to distribute managed content, the following problems exist in a conventional content distribution system configuration.

First, using a conventional content distribution system, in a case of distributing video content as managed content, successive content with a fixed bit rate is continuously distributed irrespective of mobile network bandwidth (throughput). The mobile network bandwidth varies in time in accordance with traffic volume. However, the conventional content distribution system does not perform distribution in correspondence with this variation. Therefore, in a case where the mobile network bandwidth is less than the content bit rate, there is a problem in that the content cannot be transmitted, and due to data buffered by the mobile terminal becoming exhausted, video being reproduced may stop at for some period of time or audio may be interrupted. If such phenomena occur, a viewer's QoE will be greatly impaired.

Second, in a conventional content distribution system, conventional data that is unnecessary for a viewer's current viewing is delivered. Therefore, in a case where the viewer stops viewing in mid-course, there is a problem in that un-reproduced data that has already been delivered is wasted. That is, in the conventional content distribution system, there is a problem in that limited mobile network bandwidth is unnecessarily consumed.

According to methods described in Patent Literatures 1 and 2, it is necessary to improve an apparatus on a mobile terminal (receiving terminal, client) side, and it is not possible to handle cases where the content distribution system distributes content to various types of mobile terminals.

Accordingly, there is a need in the art to prevent degradation of user QoE due to bandwidth variation in a mobile network, when content is distributed via the mobile network.

According to a first aspect of the present invention, there is provided a content distribution system, comprising a plurality of cache servers in a mobile network. Each of the plurality of cache servers comprises: a content temporary storage unit that temporarily stores at least part of the managed content(s) that is held by a storage apparatus in the mobile network; a determination unit that determines from among the plurality of cache servers a cache server that stores content(s) requested by a mobile terminal, using information included in a content request message from the mobile terminal; and a distribution unit that estimates a bandwidth of the mobile network based on a prescribed signal from the mobile terminal, reads a file with a bit rate not exceeding the bandwidth from among a plurality of files having the requested content(s) with different bit rates, from the determined cache server, and transmits the read file to the mobile terminal while controlling timing of transmission in accordance with a buffer capacity of the mobile terminal for at least some period of time.

According to a second aspect of the present invention, there is provided a cache server, comprising: a content temporary storage unit that temporarily stores at least part of the managed content(s) that is held by a storage apparatus in a mobile network; a determination unit that determines, from among a plurality of cache servers provided in the mobile network, a cache server that stores content(s)

requested by a mobile terminal, using information included in a content request message from the mobile terminal; and a distribution unit that estimates a bandwidth of the mobile network based on a prescribed signal from the mobile terminal, reads a file with a bit rate not exceeding the bandwidth from among a plurality of files having the requested content(s) with different bit rates, from the determined cache server, and transmits the read file to the mobile terminal while controlling timing of transmission in accordance with a buffer capacity of the mobile terminal for at least some period of time.

According to a third aspect of the present invention, there is provided a content distribution method, comprising: by a cache server, temporarily storing, in itself, at least part of the managed content(s) that is held by a storage apparatus in a mobile network; determining, from among a plurality of cache servers provided in the mobile network, a cache server that stores content(s) requested by a mobile terminal, using information included in a content request message from the mobile terminal; estimating a bandwidth of the mobile network based on a prescribed signal from the mobile terminal; reading a file with a bit rate not exceeding the bandwidth from among a plurality of files having the requested content(s) with different bit rates, from the determined cache server; and transmitting the read file to the mobile terminal while controlling timing of transmission in accordance with a buffer capacity of the mobile terminal for at least some period of time.

The present invention provides the following advantage, but not restricted thereto. According to the content distribution system, the cache server and the content distribution method of the present invention, it is possible to prevent degradation of user QoE due to variation of bandwidth in a mobile network, when content is distributed via the mobile network.

PREFERRED MODES

In the present disclosure, there are various possible modes, which include the following, but not restricted thereto. First, a description is given of an outline of the present invention. It is to be noted that reference symbols in the drawings attached to this outline are examples solely in order to aid understanding and are not intended to limit the invention to modes shown in the drawings.

Figure 1:
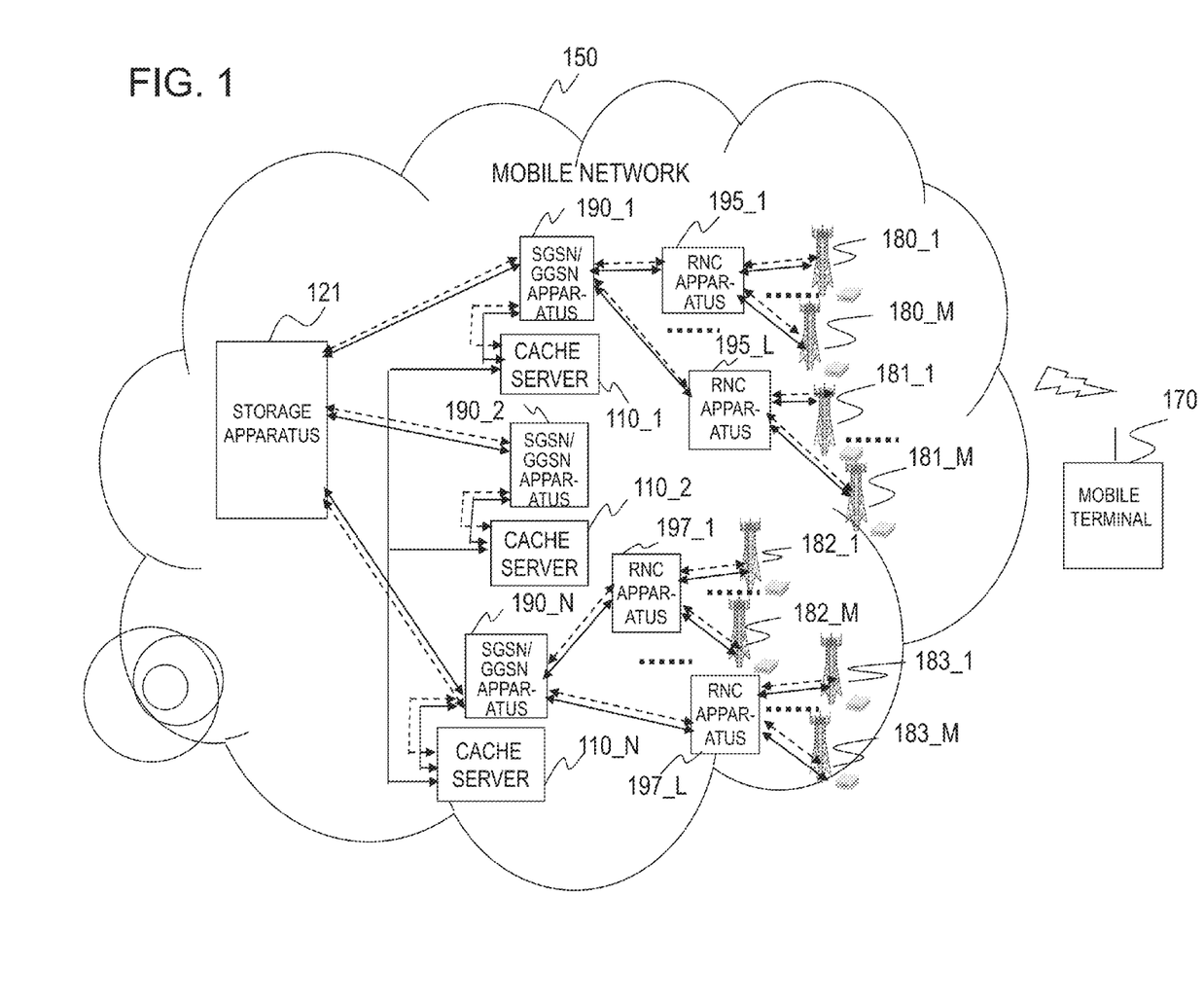
FIG. 1 is a block diagram showing an example of a configuration of a content distribution system according to a first exemplary embodiment.
Figure 2:
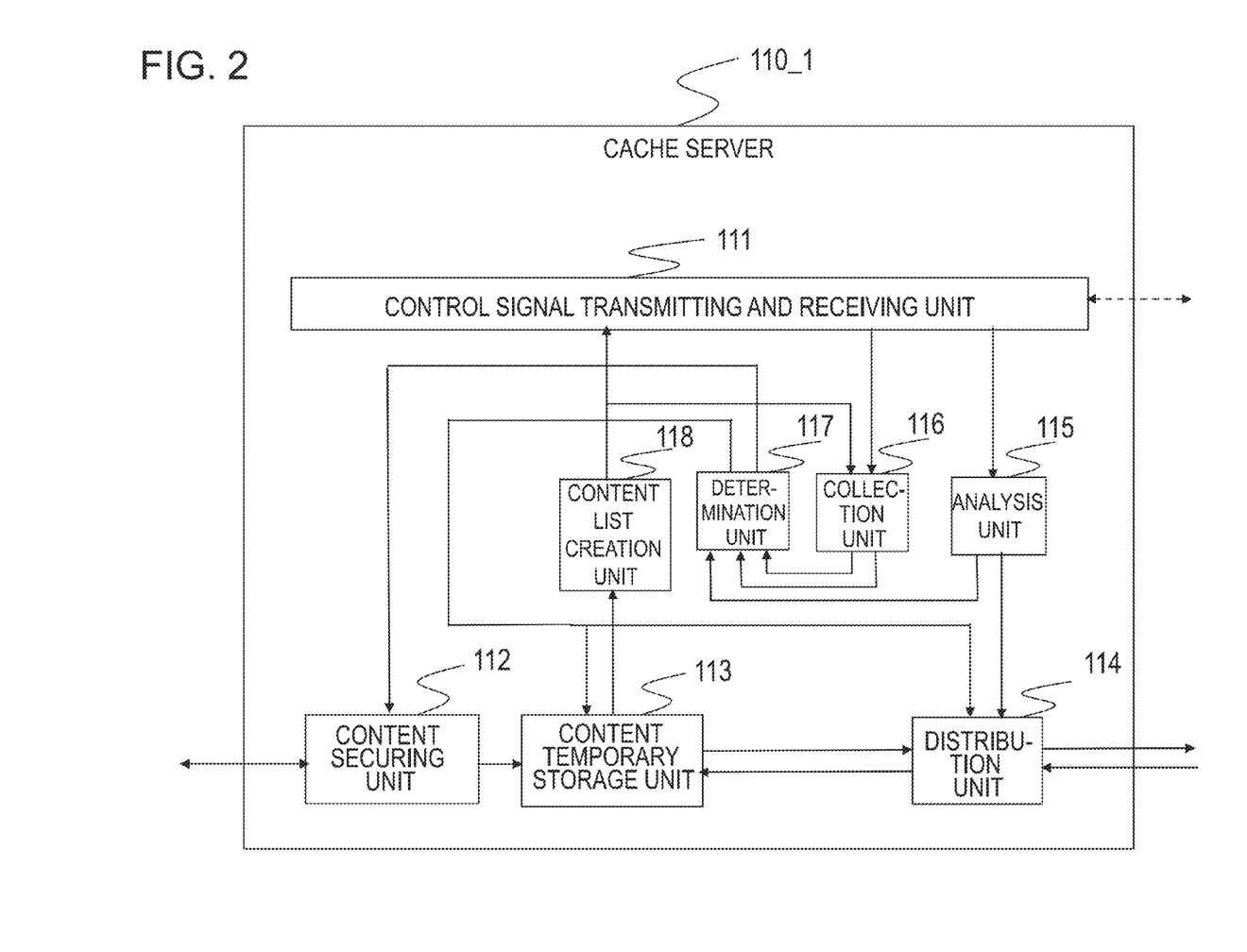
FIG. 2 is a block diagram showing an example of a configuration of a cache server in the content distribution system according to the first exemplary embodiment.

Referring to FIG. 1 and FIG. 2, a content distribution system in the present invention comprises a plurality of cache servers (110_1 to 110_N) in a mobile network (150). Each of the plurality of cache servers (110_1 to 110_N) comprises: a content temporary storage unit (113) that temporarily stores at least part of the managed content(s) that is held by a storage apparatus (121) in the mobile network (150); a determination unit (117) that determines from among the plurality of cache servers (110_1 to 110_N) a cache server that stores content(s) requested by a mobile terminal (170), using information included in a content request message from the mobile terminal (170); and a distribution unit (114) that estimates a bandwidth of the mobile network (150) based on a prescribed signal from the mobile terminal (170), reads a file with a bit rate not exceeding the bandwidth from among a plurality of files having the requested content(s) with different bit rates, from the determined cache server, and transmits the read file to the mobile terminal (170) while controlling timing of transmission in accordance with a buffer capacity of the mobile terminal (170) for at least some period of time.

In a case where a bit rate of the read file is lower than the bandwidth, the distribution unit (114) may calculate a time-period until the buffer amount reaches the buffer capacity of the mobile terminal (170), based on the bit rate in question and the buffer capacity, and not transmit the read file in a time-period until the buffer amount decided in accordance with the calculated time-period becomes zero.

In a case where a bit rate of the read file is equal to the bandwidth, the distribution unit (114) may calculate a time-period until the buffer amount of the mobile terminal (170) becomes zero, based on the bit rate with which the mobile terminal (170) plays content and the buffer capacity, and not transmit the read file in the time-period in question.

In a case of receiving a response packet with respect to a transmitted packet that is transmitted to the mobile terminal (170), from the mobile terminal (170), the distribution unit (114) may estimate a bandwidth of the mobile network (150) in accordance with difference between time of transmission of the transmitted packet and time of reception of the response packet, and a size of the transmitted packet. On the other hand, in a case of receiving a signal indicating that the mobile network (150) is in a congested state from the mobile terminal (170), the distribution unit (114) may not transmit a read file in a prescribed time-period.

Figure 4:
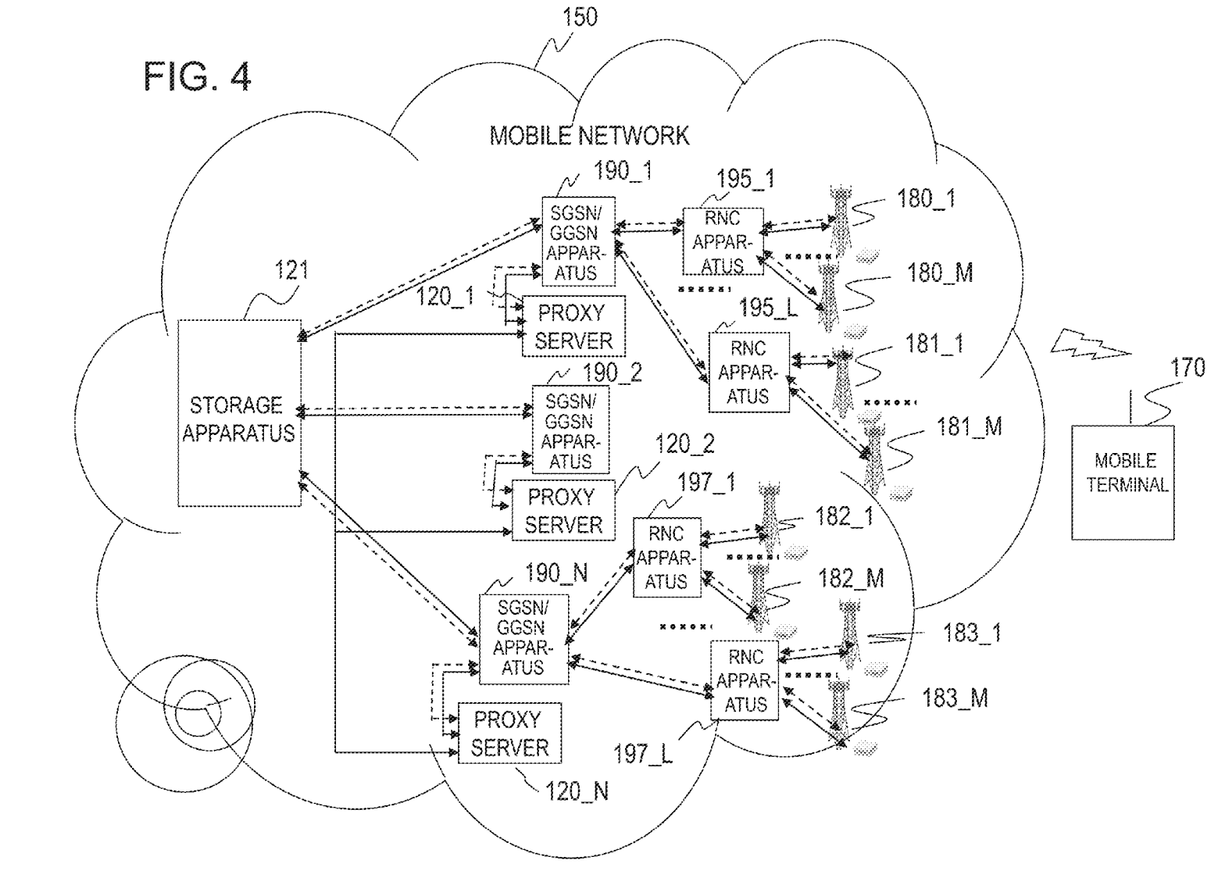
FIG. 4 is a block diagram showing an example of a configuration of the content distribution system according to a second exemplary embodiment.

Referring to FIG. 4, the abovementioned plurality of cache servers may be transparent or fully transparent proxy servers (120_1 to 120_N).

Figure 5:
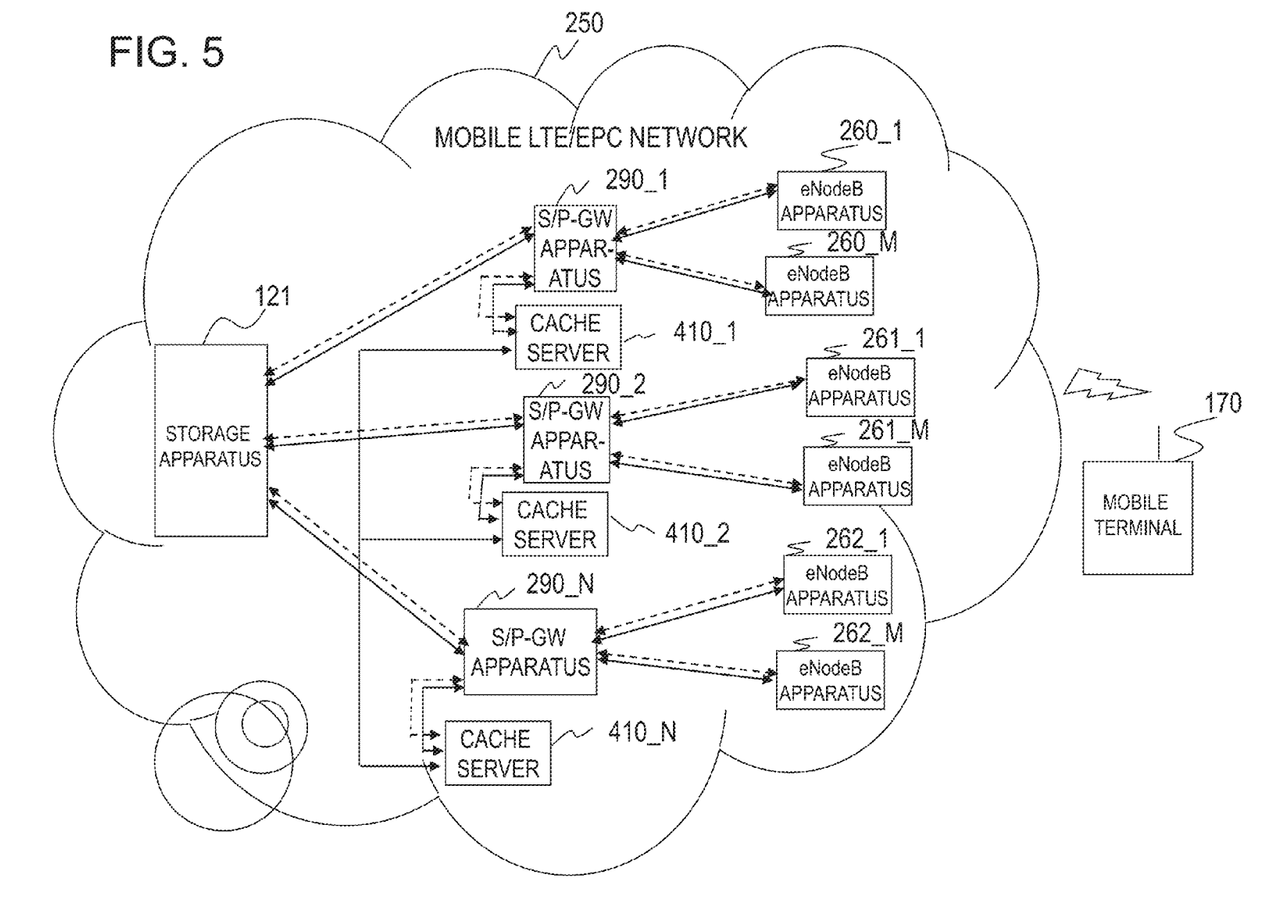
FIG. 5 is a block diagram showing an example of a configuration of the content distribution system according to a third exemplary embodiment.
Figure 6:
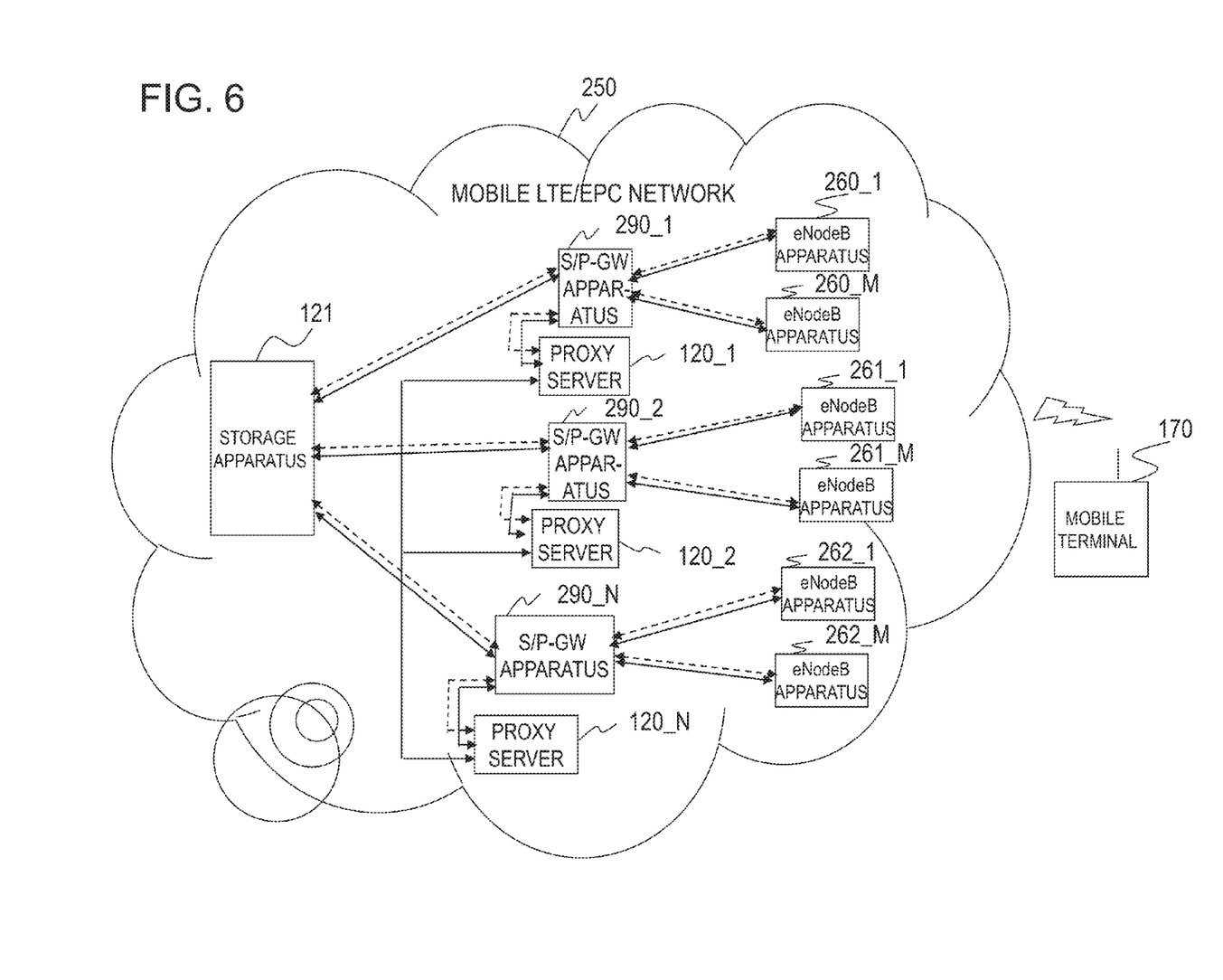
FIG. 6 is a block diagram showing an example of a configuration of the content distribution system according to a fourth exemplary embodiment.

Referring to FIG. 5 and FIG. 6, the mobile network may be a 3G (3rd Generation) mobile network or an LTE (Long Term Evolution)/EPC (Evolved Packet Core) network (250).

In the present invention, the following modes are possible.

(Mode 1)

A content distribution system may be the content distribution system according to the first aspect.

(Mode 2)

The distribution unit, in a case where a bit rate of the read file is lower than the bandwidth, may calculate a time-period until a buffer amount of the mobile terminal reaches the buffer capacity, based on the bit rate and the buffer capacity, and not transmit the read file in a time-period until the buffer amount decided in accordance with the calculated time-period becomes zero.

(Mode 3)

The distribution unit, in a case where a bit rate of the read file equals the bandwidth, may calculate a time-period until the buffer amount of the mobile terminal becomes zero, based on a bit rate at which the mobile terminal plays content(s), and the buffer capacity, and not transmit the read file in the time-period.

(Mode 4)

The distribution unit, in a case of receiving a response packet with respect to a transmitted packet that is transmitted to the mobile terminal, from the mobile terminal, may estimate the bandwidth of the mobile network in accordance with the difference between the time of transmission of the transmitted packet and the time of reception of the response packet, and a size of the transmitted packet.

(Mode 5)

The distribution unit, in a case of receiving a signal indicating that the mobile network is in a congested state from the mobile terminal, may not transmit the read file in a prescribed time-period.

(Mode 6)

The plurality of cache servers may be transparent or fully transparent proxy servers.

(Mode 7)

The mobile network may be a 3G mobile network or an LTE (Long Term Evolution)/EPC (Evolved Packet Core) network.

(Mode 8)

A cache server may be the cache server according to the second aspect.

(Mode 9)

The distribution unit, in a case where a bit rate of the read file is lower than the bandwidth, may calculate a time-period until a buffer amount of the mobile terminal reaches the buffer capacity, based on the bit rate and the buffer capacity, and not transmit the read file in a time-period until the buffer amount decided in accordance with the calculated time-period becomes zero.

(Mode 10)

The distribution unit, in a case where a bit rate of the read file equals the bandwidth, calculates a time-period until a buffer amount of the mobile terminal becomes zero, based on a bit rate at which the mobile terminal plays content(s), and the buffer capacity, and not transmit the read file in the time-period.

(Mode 11)

The distribution unit, in a case of receiving a response packet with respect to a transmitted packet that is transmitted to the mobile terminal, from the mobile terminal, may estimate the bandwidth of the mobile network in accordance with the difference between the time of transmission of the transmitted packet and the time of reception of the response packet, and a size of the transmitted packet.

(Mode 12)

The distribution unit, in a case of receiving a signal indicating that the mobile network is in a congested state from the mobile terminal, may not transmit the read file in a prescribed time-period.

(Mode 13)

A content distribution method may be the content distribution method according to the third aspect.

(Mode 14)

In the content distribution method, the cache server, in a case where a bit rate of the read file is lower than the bandwidth, may calculate a time-period until a buffer amount of the mobile terminal reaches the buffer capacity, based on the bit rate and the buffer capacity, and not transmit the read file in a time-period until the buffer amount decided in accordance with the calculated time-period becomes zero.

(Mode 15)

In the content distribution method, the cache server, in a case where a bit rate of the read file equals the bandwidth, may calculate a time-period until a buffer amount of the mobile terminal becomes zero, based on a bit rate at which the mobile terminal plays content(s), and the buffer capacity, and not transmit the read file in the time-period.

(Mode 16)

In the content distribution method, the cache server, in a case of receiving a response packet with respect to a transmitted packet that is transmitted to the mobile terminal, from the mobile terminal, may estimate the bandwidth of the mobile network in accordance with the difference between the time of transmission of the transmitted packet and the time of reception of the response packet, and a size of the transmitted packet.

(Mode 17)

In the content distribution method, the cache server, in a case of receiving a signal indicating that the mobile network is in a congested state from the mobile terminal, may not transmit the read file in a prescribed time-period.

(Mode 18)

There is provided a program that causes a computer provided in a cache server to execute: temporarily storing at least part of the managed content(s) that is held by a storage apparatus in the mobile network; determining, from among a plurality of cache servers provided in the mobile network, a cache server that stores content(s) requested by a mobile terminal, using information included in a content request message from the mobile terminal; estimating a bandwidth of the mobile network based on a prescribed signal from the mobile terminal; reading a file with a bit rate not exceeding the bandwidth from among a plurality of files having the requested content(s) with different bit rates, from the determined cache server; and transmitting the read file to the mobile terminal while controlling timing of transmission in accordance with a buffer capacity of the mobile terminal for at least some period of time. It is to be noted that the program may be provided as a program product recorded on a non-transient computer readable recording medium.

(Mode 19)

The program may cause the computer to execute: calculating, in a case where a bit rate of the read file is lower than the bandwidth, a time-period until a buffer amount of the mobile terminal reaches the buffer capacity, based on the bit rate and the buffer capacity, and not transmitting the read file in a time-period until the buffer amount decided in accordance with the calculated time-period becomes zero.

(Mode 20)

The program may cause the computer to execute: calculating, in a case where a bit rate of the read file equals the bandwidth, a time-period until a buffer amount of the mobile terminal becomes zero, based on a bit rate at which the mobile terminal plays content(s), and the buffer capacity, and not transmitting the read file in the time-period.

(Mode 21)

The program may cause the computer to execute: estimating, in a case of receiving a response packet with respect to a transmitted packet that is transmitted to the mobile terminal, from the mobile terminal, the bandwidth of the mobile network in accordance with the difference between the time of transmission of the transmitted packet and the time of reception of the response packet, and a size of the transmitted packet.

(Mode 22)

The program may cause the computer to execute: not transmitting, in a case of receiving a signal indicating that the mobile network is in a congested state from the mobile terminal, the read file in a prescribed time-period.

A detailed description is given concerning configurations and operations of the content distribution system according to exemplary embodiments, making reference to FIG. 1 to FIG. 6. It is to be noted that in the following exemplary embodiments, configurations of a case where the content is a video image are shown as an example.

(First Exemplary Embodiment)

A description is given concerning the content distribution system according to a first exemplary embodiment, making reference to the drawings. FIG. 1 is a block diagram showing an example of a configuration of the content distribution system according to the present exemplary embodiment. Referring to FIG. 1, the content distribution system is provided with a storage apparatus 121, SGSN (Serving GPRS Support Node)/GGSN (Gateway GPRS Support Node) apparatuses 190_1 to 190_N, cache servers 110_1 to 110_N, RNC (Radio Network Controller) apparatuses 195_1 to 195_L, and 197_1 to 197_L, and base station apparatuses 180_1 to 180_M, 181_1 to 181_M, 182_1 to 182_M, and 183_1 to 183_M, in a mobile network 150.

FIG. 1 shows a configuration of a case of using a 3G mobile packet network as the mobile network, and SGSN/GGSN apparatuses as packet forwarding apparatuses. FIG. 1 shows a configuration using cache servers.

In FIG. 1, the storage apparatus 121 stores video content as managed content. The storage apparatus 121 stores M (M≥2) files of different bit rates, in advance, as one content item. A mobile terminal 170 is used as a terminal. However, it is also possible to use a terminal outside of the mobile terminal 170.

In the mobile network 150, N (N≥2) SGSN/GGSN apparatuses 190_1 to 190_N are provided. RNC apparatuses 195_1 to 195_L (L≥2) are connected to the SGSN/GGSN apparatus 190_1. Similarly, RNC apparatuses 197_1 to 197_L are connected to the SGSN/GGSN apparatus 190_N. It is to be noted that L RNC apparatuses are also connected to the SGSN/GGSN apparatus 190_2, but a description is omitted in FIG. 1 for space considerations.

M (M≥2) base station apparatuses are connected to one RNC apparatus. For example, M base station apparatuses 180_1 to 180_M are connected to the RNC apparatus 195_1.

In FIG. 1, one cache server is connected to a GGSN functional unit of each SGSN/GGSN apparatus. For example, a cache server 110_1 is connected to the SGSN/GGSN apparatus 190_1. Here, an SGSN/GGSN apparatus indicates an apparatus configuration in which an SGSN functional unit and a GGSN functional unit are arranged in the same location.

The mobile terminal 170 issues a connection request message for distribution, describing a URL (Uniform Resource Locator) of requested video content. Thereupon, a base station apparatus (any of the base station apparatuses 181_1 to 181_M in the case of FIG. 1), in whose range the mobile terminal 170 is present, receives the connection request message and transmits the connection request message to the RNC apparatus (RNC apparatus 195_L in the case of FIG. 1) that manages the base station apparatus.

The RNC apparatus 195_L receives the connection request message from the base station apparatus stores the connection request message, an IP (Internet Protocol) address of the storage apparatus 121 and an IP address of the mobile apparatus 170 in a payload part of a GTP packet (GPRS (General Packet Radio Service) Tunneling Protocol), and forwards the GTP packet to the SGSN/GGSN apparatus 190_1 coordinating the RNC apparatuses 195_1 to 195_L.

Next, the SGSN/GGSN apparatus 190_1 receives the GTP packet.

The cache server 110_1, for example, is connected to a Gi interface of the GGSN functional part of the SGSN/GGSN apparatus 190_1. Similarly, the cache server 110_N is connected to a Gi interface of the GGSN functional part of the SGSN/GGSN apparatus 190_N. The cache servers 110_1 to 110_N are connected to each other so as to enable acquisition of content by cooperation between the cache servers when content is acquired from a cache server.

Here, cooperation between the cache servers means, for example, in a case where a cache server 110_1 receives a request from the mobile terminal 170, that although the content requested by the cache server 110_1 is not cached, when the cache server 110_N has cached the content, the cache server 110_1 reads and secures the requested content that is cached by the cache server 110_N, and the cache server 110_1 performs distribution.

A description is given concerning a configuration of the cache server 110_1 connected to the SGSN/GGSN apparatus 190_1, making reference to the drawings. FIG. 2 is a block diagram showing an example of a configuration of the cache server 110_1. Since configurations of the cache servers 110_2 to 110_N outside of the cache server 110_1 are the same as the configuration of the cache server 110_1, a description thereof is omitted.

Referring to FIG. 2, the cache server 110_1 is provided with a control signal transmitting and receiving unit 111, an analysis unit 115, a collection unit 116, a determination unit 117, a content securing unit 112, a content temporary storage unit 113, a content list creation unit 118, and a distribution unit 114.

The control signal transmitting and receiving unit 111 receives the GTP packet storing the connection request message from the mobile terminal 170, the reception IP address of the mobile terminal 170, the request content URL and the like, from the SGSN/GGSN apparatus 190_1. The control signal transmitting and receiving unit 111 receives information of the zone in which the mobile terminal 170 is present, from the SGSN/GGSN apparatus 190_1.

The analysis unit 115 reads what is contained in the connection request message stored in the payload part of the GTP packet, extracts information such as the reception IP address of the mobile terminal 170, the URL of the requested content and the like, and outputs the requested content URL, the reception IP address of the mobile terminal 170 and the like, to the distribution unit 114 and the determination unit 117.

The collection unit 116 receives a content list of content stored by the cache server 110_1, and a content list of content stored, outside of the cache server 110_1, by the cache servers 110_2 to 110_N, and outputs to the determination unit 117. The determination unit 117 may carry out a collection of the content list each predetermined time interval, or when there is a request for a connection from the mobile terminal 170, or when there is a request for a collection from other cache servers 110_2 to 110_N.

The determination unit 117 receives information such as the reception IP address of the mobile terminal 170, the URL of the requested content, a content list of content stored by the cache server 110_1, and a content list of content stored outside of the cache server 110_1, by the cache servers 110_2 to 110_N. The determination unit 117 determines whether the content requested by the mobile terminal 170 is stored by the cache server 110_1, or is stored outside of the cache server 110_1, by the cache servers 110_2 to 110_N.

In a case where the content requested by the mobile terminal 170 is stored by the cache server 110_1, the determination unit 117 instructs the content temporary storage unit 113 and the distribution unit 114 to perform reading and distribution. On the other hand, in a case where the content requested by the mobile terminal 170 is stored by any cache server among the cache servers 110_2 to 110_N, the determination unit 117 communicates the URL of the requested content and the IP address of the storing cache server to the content securing unit 112, and gives an instruction to secure the content from the relevant cache server by cooperation among the cache servers. It is to be noted that in a case where none of the cache server 110_1 and the cache servers 110_2 to 110_N outside of the cache server 110_1 stores the content requested by the mobile terminal 170, the determination unit 117 instructs the content securing unit 112 to secure the content from the storage apparatus 121.

The content securing unit 112 receives the URL of the content requested by the determination unit 117, the content securing instruction, the IP address of the cache server in the case of another cache server, and the IP address of the storage apparatus 121 in the case of the storage apparatus 121, secures duplication for a plurality of files of different bit rates, with regard to the requested content, and outputs to the content temporary storage unit 113.

The content temporary storage unit 113 stores content outputted from the content securing unit 112. When the content temporary storage unit 113 receives a content read instruction from the determination unit 117, and a specific bit rate is instructed by the distribution unit 114, a file with the bit rate specified by the distribution unit 114 is read from files of a plurality of bit rates with respect to the content corresponding to the URL of the requested content, and is outputted to the distribution unit 114.

The content list creation unit 118 creates as needed a list of all content stored by the content temporary storage unit 113, and, each predetermined time interval, when there is a request from another cache server or when there is a request from the collection unit 116, outputs the content list.

The distribution unit 114 receives URL information for the requested content from the analysis unit 115, and also receives a content distribution instruction and plural types (M types) of bit rate information of the relevant content from the determination unit 117. The distribution unit 114 reads a file of a specific bit rate from the plural bit rate files, from the content temporary storage unit 113 with respect to the requested content, generates a packet of a predetermined protocol (for example, TCP (Transmission Control Protocol)), and transmits to the SGSN/GGSN apparatus 190_1. The SGSN/GGSN apparatus 190_1 distributes the packet including the content to the mobile terminal 170.

Figure 3:
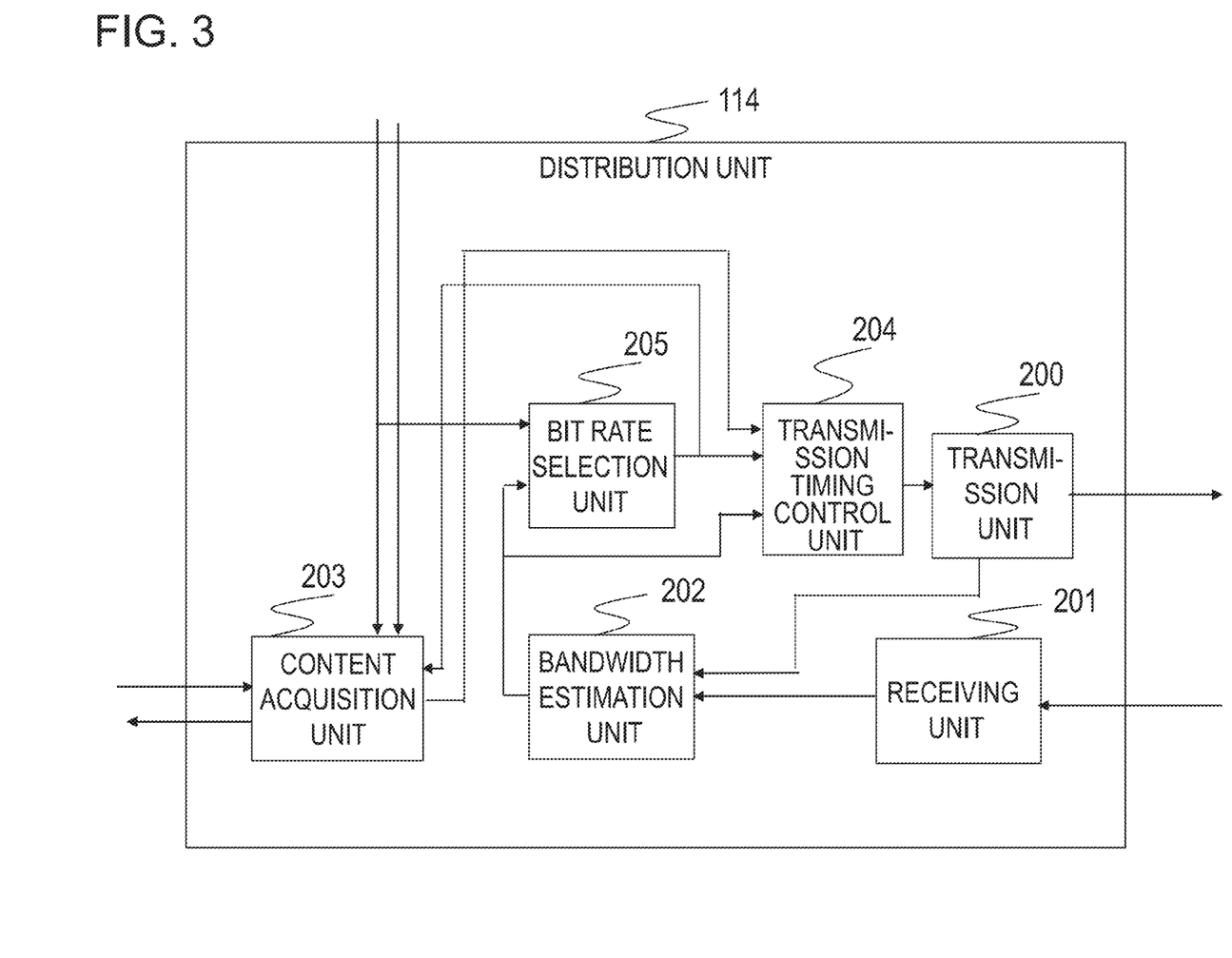
FIG. 3 is a block diagram showing an example of a configuration of a distribution unit in a cache server in the content distribution system according to the first exemplary embodiment.

FIG. 3 is a block diagram showing an example of a configuration of the distribution unit 114. Referring to FIG. 3, the distribution unit 114 is provided with a receiving unit 201, a bandwidth estimation unit 202, a content acquisition unit 203, a bit rate selection unit 205, a transmission timing control unit 204 and a transmission unit 200.

The receiving unit 201 receives a packet of a TCP response signal (for example, a TCP Ack signal packet) via a SGSN/GGSN apparatus from the mobile terminal 170, and outputs information of the TCP response signal packet to the bandwidth estimation unit 202. It is to be noted that as another configuration, in a case of receiving an ECN (Explicit Congestion Notification) signal giving notification of a congestion state from the mobile terminal 170, the receiving unit 201 may output an instruction to rapidly reduce the bandwidth, with regard to the bandwidth estimation unit 202.

The bandwidth estimation unit 202 receives information of a transmitted packet transmitted by the transmission unit 200 (for example, transmission time of a transmitted packet and the size of a transmitted packet) and receives information of the abovementioned TCP response signal packet. The bandwidth estimation unit 202 measures response time $T_n$ from equation (1), by associating the TCP response signal packet and the transmitted packet using the transmitted packet number.

$$T_n = T_n^{ack} - T_n^{send} \quad (1)$$

Here, $T_n$ represents the response time of an n-th packet, $T_n^{ack}$ represents the time at which the n-th TCP response signal packet is received by the receiving unit 201, and $T_n^{send}$ represents the time at which the n-th transmitted packet is transmitted by the transmission unit 200.

With the size of the n-th transmitted packet as $S_n$ the bandwidth estimation unit 202 estimates bandwidth $B_n$ for the n-th packet from equation (2) and equation (3).

$$P_n = S_n / T_n \quad (2)$$

$$B_n = (1-\alpha) \times B_{n-1} + \alpha \times P_n \quad (3)$$

In equation (3), $\alpha$ is a predetermined constant that satisfies $0 < \alpha < 1$.

It is to be noted that the bandwidth estimation unit 202 may perform the calculations of equation (2) and equation (3) each predetermined time interval.

The bandwidth estimation unit 202 outputs the bandwidth $B_n$ estimated by equation (3) to the bit rate selection unit 205 and the transmission timing control unit 204, each predetermined time interval.

It is to be noted that in a case where an ECN signal is received from the receiving unit 201, the bandwidth estimation unit 202 determines that the mobile network is in a congested state and may reduce the bandwidth $B_n$ estimated by equation (2) by a predetermined amount, or may set $B_n = 0$. Here the setting of $B_n = 0$ is a setting whereby a packet is not transmitted from the transmission unit 200 in a predetermined time interval.

The bit rate selection unit 205 receives plural types (M types) of bit rate information for content requested by the determination unit 117 of FIG. 2, receives an estimated bandwidth $B_n$ each predetermined time interval T from the bandwidth estimation unit 202, and selects a bit rate $B_s$ (units of kbps) closest to the estimated bandwidth $B_n$ in a range that does not exceed the estimated bandwidth $B_n$. The bit rate selection unit 205 instructs the content acquisition unit 203 to output a file at the selected bit rate $B_s$ to the transmission timing control unit 204. The bit rate selection unit 205 outputs the selected bit rate $B_s$ to the transmission timing control unit 204.

The content acquisition unit 203 receives the URL for requested content from the analysis unit 115 of FIG. 2, receives a content distribution instruction from the determination unit 117 of FIG. 2, and receives the selected bit rate $B_s$ from the bit rate selection unit 205. The content acquisition unit 203 reads a file of content related to the URL, being the file corresponding to the instructed bit rate $B_s$ from among plural bit rates, from the content temporary storage unit 113 of FIG. 2, and outputs to the transmission timing control unit 204.

The transmission timing control unit 204 receives the bandwidth $B_n$ from the bandwidth estimation unit 202, receives the bit rate $B_s$ from the bit rate selection unit 205, receives a file corresponding to the specified bit rate $B_s$ from the acquisition unit 203, and controls transmission timing as below, for example, with regard to the file in question.

In a case where $B_s<B_n$, the transmission timing control unit 204 outputs an inputted file to the transmission unit 200 during a time interval T1 in which buffer capacity L (units are kilobytes) of the mobile terminal 170 is full. Here, the time interval T1 is given by equation (4).

$$T1=L/(B_s*8) \qquad (4)$$

The time interval T is a time interval in which T1<T, and the buffer capacity L of the mobile terminal 170 is not empty of data during a time interval T−T1.

On the other hand, in a case where $B_s=B_n$, the transmission timing control unit 204 does not output content to the transmission unit 200 during a predetermined time interval T2. It is to be noted that the time interval T2 is a time interval in which the buffer capacity L of the mobile terminal 170 is not empty of data. Here, the maximum value of the time interval T2 is given by equation (5).

$$\text{Max } T2=L/(B_p*8) \qquad (5)$$

In equation (5), the bit rate $B_p$ indicates a bit rate when a video is reproduced by the mobile terminal 170.

The transmission unit 200, during the time interval T1 in which content is outputted from the transmission timing control unit 204, stores the content in TCP packets to be transmitted to the mobile terminal 170 via the SGSN/GGSN apparatus 190_1, an RNC apparatus and a base station apparatus. On the other hand, the transmission unit 200, during the time interval T−T1 and the time interval T2, does not transmit TCP packets. The transmission unit 200 outputs a transmitted n-th packet of size $S_n$ to the transmission estimation unit 202.

Various types of modification are possible with regard to the content distribution system according the first exemplary embodiment as described above.

FIG. 1 shows a configuration in a case where one cache server is connected to one SGSN/GGSN apparatus. However, one cache server may be connected to a plurality of SGSN/GGSN apparatuses. Furthermore, a plurality of cache servers may be connected to one SGSN/GGSN apparatus.

The storage apparatus 121 may be connected to the cache server apparatuses 110_1 to 110_N.

FIG. 1 shows a configuration of a case of using SGSN/GGSN apparatuses where an SGSN apparatus and an GGSN apparatus are integrated. However, it is also possible to use a configuration in which the SGSN apparatus and the GGSN apparatus are separated. In the case of this configuration, at least one cache server is connected to either the SGSN apparatus or the GGSN apparatus.

The bandwidth estimation unit 202 may estimate bandwidth based on an equation outside of equation (2) and equation (3). In addition, the transmission timing control unit 204 can use another method or another equation, as a transmission timing control method. The transmission timing control unit 204 may control transmission timing for at least some of a time-period (time interval), and not control transmission timing for other time-periods.

In addition, the mobile terminal 170 may be a mobile telephone, a smart phone, a tablet or a PC in which a data communication card is installed. The mobile terminal 170 may be any other terminal, as long as it is a terminal in which communication with a mobile 3G network is possible.

(Second Exemplary Embodiment)

A description is given concerning the content distribution system according to a second exemplary embodiment, making reference to the drawings. FIG. 4 is a block diagram showing an example of a configuration of the content distribution system according to the present exemplary embodiment.

Referring to FIG. 4, the present exemplary embodiment, as a modification of the first exemplary embodiment (FIG. 1), uses proxy servers 120_1 to 120_N instead of cache servers 110_1 to 110_N. In FIG. 4, since component elements with attached numbers that are the same as in FIG. 1 operate in the same way as in FIG. 1, descriptions thereof are omitted.

With regard to the proxy servers 120_1 to 120_N, two types of mode can be considered: transparent and fully transparent. Here a description is given concerning the proxy server 120_1. Since operations of the proxy servers 120_2 to 120_N outside of the proxy server 120_1 are the same as operations of the proxy server 120_1, a description thereof is omitted.

First a description is given concerning a case where the proxy server 120_1 is a transparent proxy server. The proxy server 120_1 temporarily terminates a message signal from a mobile terminal 170 and analyzes the message signal. The proxy server 120_1 distributes content temporarily stored in the proxy server 120_1 to the mobile terminal 170. The proxy server 120_1 makes requests and performs access with regard to a storage apparatus 121, via the SGSN/GGSN apparatus 190_1, as necessary.

Next, a description is given concerning a case where the proxy server 120_1 is a fully transparent proxy server. The proxy server 120_1 does not change the URL for requested content, the IP address of the storage apparatus 121 on the Internet, the mobile terminal IP address and the like, included in a request signal from the mobile terminal 170. The proxy server 120_1 does not terminate signals from the mobile terminal 170 but uses DPI (Deep Packet Inspection) technology to check the header part or the like of a packet, and extracts information such as the URL for requested content, the IP address of the mobile terminal 170, and the like. In a case where the requested content is cached in the proxy server 120_1, the proxy server 120_1 distributes the requested content from the proxy server 120_1.

It is to be noted that since the configuration of the proxy server 120_1 is the same as the configuration (FIG. 2) of the cache server 110_1 in the first exemplary embodiment, a detailed description thereof is omitted.

(Third Exemplary Embodiment)

A description is given concerning the content distribution system according to a third exemplary embodiment, making reference to the drawings. FIG. 5 is a block diagram showing an example of a configuration of the content distribution system according to the present exemplary embodiment.

Referring to FIG. 5, in the present exemplary embodiment, as a mobile network 250, instead of a 3G mobile network 150 as shown in FIG. 1, an LTE (Long Term Evolution)/EPC (Evolved Packet Core) network 250, which is a 3.9 generation mobile network, is used. In LTE, functionality of base station apparatuses and RNC apparatuses is reduced, to only have eNodeB (evolved Node B) apparatuses.

In EPC, an S/P-GW (Serving/Packet Data-Gateway) apparatus is connected to eNodeB apparatuses. An S/P-GW apparatus indicates a configuration in which an S-GW apparatus and a P-GW apparatus are integrated. FIG. 5 illustrates a configuration in which M eNodeB apparatuses are connected to one S/P-GW apparatus. For example, the eNodeB apparatuses 260_1 to 260_M are connected to an S/P-GW apparatus 290_1.

One cache server is connected to each S/P-GW apparatus. For example, a cache server 410_1 is connected to the S/P-GW apparatus 290_1. The cache servers 410_1 to 410_N are connected to each other, to enable cooperation with regard to content.

A mobile terminal 170 issues a connection request message to a storage apparatus 121, describing the IP address of the storage apparatus 121. Thereupon, an eNodeB apparatus in whose zone the mobile terminal 170 is present (any of the eNodeB apparatuses 261_1 to 261_M in FIG. 5) receives the connection request message. Any of the eNodeB apparatuses 261_1 to 261_M stores the connection request message, the IP address of the storage apparatus 121 and the IP address of the mobile terminal 170 in a payload part of a GTP protocol, and forwards a GTP packet to an S/P-GW apparatus 290_2.

The cache server 410_1 has a configuration similar to the cache server 110_1 (FIG. 2) in the first exemplary embodiment. However, in the present exemplary embodiment, a connection destination of a control signal transmitting and receiving unit 111 is the S/P-GW apparatus 290_1. Therefore, the control signal transmitting and receiving unit 111 receives the GTP packet storing the connection request message and the IP address etc. from the mobile terminal 170, and location information of the mobile terminal 170, from the S/P-GW apparatus 290_1. It is to be noted that the other cache servers 410_2 to 410_N also perform the abovementioned exchange with S/P-GW apparatuses 290_2 to 290_N connected to each thereof.

Various types of modification are possible with regard to the content distribution system according the third exemplary embodiment as described above.

FIG. 5 shows a configuration using S/P-GW apparatuses in which an S-GW apparatus and a P-GW apparatus are integrated. However, it is also possible to use a configuration in which the S-GW apparatus and the P-GW apparatus are separated. In the case of this configuration, at least one cache server is connected to either the S-GW apparatus or the P-GW apparatus.

The mobile terminal 170 may be a mobile telephone, a smart phone, or a PC in which a data communication card is installed. The mobile terminal 170 may be any other terminal, as long as it is a terminal in which communication with a mobile 3.9G network is possible.

(Fourth Exemplary Embodiment)

A description is given concerning the content distribution system according to a fourth exemplary embodiment, making reference to the drawings. FIG. 6 is a block diagram showing an example of a configuration of the content distribution system according to the present exemplary embodiment.

FIG. 6 shows a configuration in which cache servers are replaced by proxy servers, with respect to the content distribution system (FIG. 5) according to the third exemplary embodiment. Since operations of the content distribution system in this case are similar to operations of the content distribution system according to the second exemplary embodiment, a description thereof is omitted.

According to the content distribution system of the first through fourth exemplary embodiments, the following effects are provided, for example.

In the content distribution system according to the abovementioned exemplary embodiments, in a case of distributing video content as managed content, bandwidth (throughput) of the mobile network is estimated, and file bit rates are switched so that the bit rate of a transmitted file does not exceed the estimated bandwidth. According to the content distribution system, the following problems may be overcome, i.e., the problem being such that in a case where the bandwidth of the mobile network is less than the bit rate of a file, the file is not transmitted, data buffered by the mobile terminal is depleted, the video that is being reproduced, stopped for some time, or audio being interrupted. In this way, the QoE (Quality of Experience) of viewers can be improved.

In the content distribution system according to the abovementioned exemplary embodiments, the bandwidth (throughput) of the mobile network is estimated and the buffer capacity of the mobile terminal is assumed, and timing of transmission is controlled so as not to exceed the bandwidth of the mobile network or the buffer capacity. According to the content distribution system, conventional distribution of data not necessary for current viewing by viewers is no longer performed, and even when viewing is stopped midway by a viewer, the data which is already under distribution will become a distribution at an appropriate data amount based on the estimated bandwidth. That is, according to the content distribution system of the abovementioned exemplary embodiments, it is possible to eliminate the problem of unnecessary consuming of the limited bandwidth of the mobile network by distributing excessive data amounts, as in a conventional content distribution system.

Furthermore, these effects are provided without any remodeling of a terminal.

It is to be noted that the respective disclosures of the abovementioned Patent Literatures are hereby incorporated by reference into this specification. Modifications and adjustments of exemplary embodiments are possible within the bounds of the entire disclosure (including the scope of the claims) of the present invention and also based on fundamental technological concepts thereof. Furthermore, multiple combinations and selections of various disclosed elements (including respective elements of the respective claims, respective elements of the respective exemplary embodiments, and respective elements of the respective drawings) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described in the present specification, an arbitrary numerical value or a small range included in the relevant range should be interpreted to be specifically described even where there is no particular description thereof.

REFERENCE SIGNS LIST

110_1 to 110_N, 410_1 to 410_N cache servers
111 control signal transmitting and receiving unit
112 content securing unit
113 content temporary storage unit
114 distribution unit
115 analysis unit
116 collection unit
117 determination unit
118 content list creation unit
120_1 to 120_N proxy server
121 storage apparatus
145 Internet
150 mobile network 170 mobile terminal
180_1 to 180_M, 181_1 to 181_M, 182_1 to 182_M, 183_1 to 183_M base station apparatuses
190_1 to 190_N SGSN/GGSN apparatuses
195_1 to 195_L, 197_1 to 197_L RNC apparatuses
200 transmission unit
201 receiving unit
202 bandwidth estimation unit
203 content acquisition unit
204 transmission timing control unit
205 bit rate selection unit
250 mobile LTE/EPC network
260_1 to 260_M, 261_1 to 261_M, 262_1 to 262_M eNodeB apparatus
290_1 to 290_N S/P-GW apparatus

What is claimed is:

1. A content distribution system, comprising a plurality of cache servers in a mobile network, wherein each of the plurality of cache servers comprises:
a processor;
a memory storing a plurality of units comprising instructions for execution on the processor, the plurality of units includes:
a content temporary storage unit that temporarily stores at least part of a managed content(s) that is held by a storage apparatus in the mobile network;
a determination unit that determines from among the plurality of cache servers a cache server that stores content(s) requested by a mobile terminal, using information included in a content request message from the mobile terminal; and
a distribution unit that estimates a bandwidth of the mobile network based on a prescribed signal from the mobile terminal, reads a file with a bit rate not exceeding the bandwidth from among a plurality of files having the requested content(s) with different bit rates, from the determined cache server, and transmits the read file to the mobile terminal while controlling timing of transmission in accordance with a buffer capacity of the mobile terminal for at least some period of time;
wherein the distribution unit, in a case where a bit rate of the read file equals the bandwidth, calculates a time-period until a buffer amount of the mobile terminal becomes zero, based on a bit rate at which the mobile terminal plays content(s), and the buffer capacity, and does not transmit the read file in the time-period.

2. The content distribution system according to claim 1, wherein the distribution unit, in a case where a bit rate of the read file is lower than the bandwidth, calculates a time-period until a buffer amount of the mobile terminal reaches the buffer capacity, based on the bit rate and the buffer capacity, and does not transmit the read file in a time-period until the buffer amount decided in accordance with the calculated time-period becomes zero.

3. The content distribution system according to claim 1, wherein the distribution unit, in a case of receiving a response packet with respect to a transmitted packet that is transmitted to the mobile terminal, from the mobile terminal, estimates the bandwidth of the mobile network in accordance with difference between time of transmission of the transmitted packet and time of reception of the response packet, and a size of the transmitted packet.

4. The content distribution system according to claim 1, wherein the distribution unit, in a case of receiving a signal indicating that the mobile network is in a congested state from the mobile terminal, does not transmit the read file in a prescribed time-period.

5. The content distribution system according to claim 1, wherein the plurality of cache servers are transparent or fully transparent proxy servers.

6. The content distribution system according to claim 1, wherein the mobile network is a 3G mobile network or an LTE (Long Term Evolution) /EPC (Evolved Packet Core) network.

7. A cache server, comprising:
a processor;
a memory storing a plurality of units comprising instructions for execution on the processor, the plurality of units includes:
a content temporary storage unit that temporarily stores at least part of a managed content(s) that is held by a storage apparatus in a mobile network;
a determination unit that determines, from among a plurality of cache servers provided in the mobile network, a cache server that stores content(s) requested by a mobile terminal, using information included in a content request message from the mobile terminal; and
a distribution unit that estimates a bandwidth of the mobile network based on a prescribed signal from the mobile terminal, reads a file with a bit rate not exceeding the bandwidth from among a plurality of files having the requested content(s) with different bit rates, from the determined cache server, and transmits the read file to the mobile terminal while controlling timing of transmission in accordance with a buffer capacity of the mobile terminal for at least some period of time;
wherein the distribution unit, in a case where a bit rate of the read file equals the bandwidth, calculates a time-period until a buffer amount of the mobile terminal becomes zero, based on a bit rate at which the mobile terminal plays content(s), and the buffer capacity, and does not transmit the read file in the time-period.

8. The cache server according to claim 7, wherein the distribution unit, in a case where a bit rate of the read file is lower than the bandwidth, calculates a time-period until a buffer amount of the mobile terminal reaches the buffer capacity, based on the bit rate and the buffer capacity, and does not transmit the read file in a time-period until the buffer amount decided in accordance with the calculated time-period becomes zero.

9. The cache server according to claim 7, wherein the distribution unit, in a case of receiving a response packet with respect to a transmitted packet that is transmitted to the mobile terminal, from the mobile terminal, estimates the bandwidth of the mobile network in accordance with difference between time of transmission of the transmitted packet and time of reception of the response packet, and a size of the transmitted packet.

10. The cache server according to claim 7, wherein the distribution unit, in a case of receiving a signal indicating that the mobile network is in a congested state from the mobile terminal, does not transmit the read file in a prescribed time-period.

11. A content distribution method, comprising:
by a cache server, temporarily storing, in itself, at least part of a managed content(s) that is held by a storage apparatus in a mobile network;
determining, from among a plurality of cache servers provided in the mobile network, a cache server that stores content(s) requested by a mobile terminal, using information included in a content request message from the mobile terminal;
estimating a bandwidth of the mobile network based on a prescribed signal from the mobile terminal;

reading a file with a bit rate not exceeding the bandwidth from among a plurality of files having the requested content(s) with different bit rates, from the determined cache server; and transmitting the read file to the mobile terminal while controlling timing of transmission in accordance with a buffer capacity of the mobile terminal for at least some period of time;

wherein the cache server, in a case where a bit rate of the read file equals the bandwidth, calculates a time-period until a buffer amount of the mobile terminal becomes zero, based on a bit rate at which the mobile terminal plays content(s), and the buffer capacity, and does not transmit the read file in the time-period.

12. The content distribution method according to claim 11, wherein the cache server, in a case where a bit rate of the read file is lower than the bandwidth, calculates a time-period until a buffer amount of the mobile terminal reaches the buffer capacity, based on the bit rate and the buffer capacity, and does not transmit the read file in a time-period until the buffer amount decided in accordance with the calculated time-period becomes zero.

13. The content distribution method according to claim 11, wherein the cache server, in a case of receiving a response packet with respect to a transmitted packet that is transmitted to the mobile terminal, from the mobile terminal, estimates the bandwidth of the mobile network in accordance with difference between time of transmission of the transmitted packet and time of reception of the response packet, and a size of the transmitted packet.

14. The content distribution method according to claim 11, wherein the cache server, in a case of receiving a signal indicating that the mobile network is in a congested state from the mobile terminal, does not transmit the read file in a prescribed time-period.

* * * * *